United States Patent
Kim et al.

(10) Patent No.: US 11,108,935 B2
(45) Date of Patent: Aug. 31, 2021

(54) BIDIRECTIONAL SYNCHRONIZING CAMERA, CAMERA SYSTEM INCLUDING THE SAME AND METHOD OF OPERATING THE CAMERA

(71) Applicant: Samsung Electronics Co., Ltd., Suwon-si (KR)

(72) Inventors: Il Joong Kim, Seoul (KR); Jeong A Jo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/024,996

(22) Filed: Sep. 18, 2020

(65) Prior Publication Data
US 2021/0006688 A1    Jan. 7, 2021

Related U.S. Application Data

(63) Continuation of application No. 16/815,487, filed on Mar. 11, 2020, now Pat. No. 10,873,683, which is a (Continued)

(30) Foreign Application Priority Data

Sep. 23, 2015    (KR) .................. 10-2015-0134898

(51) Int. Cl.
*H04N 5/067*    (2006.01)
*H04N 5/247*    (2006.01)
(Continued)

(52) U.S. Cl.
CPC ......... *H04N 5/067* (2013.01); *H04N 5/23203* (2013.01); *H04N 5/247* (2013.01); *H04N 13/296* (2018.05)

(58) Field of Classification Search
CPC .... H04N 5/067; H04N 5/23203; H04N 5/247; H04N 13/0296
(Continued)

(56) References Cited

U.S. PATENT DOCUMENTS 4,091,422 A    5/1978   Amster
4,670,786 A    6/1987   Ricciardi
(Continued)

FOREIGN PATENT DOCUMENTS

JP    2007-060129 A    3/2007
JP    2008-079142 A    4/2008
(Continued)

OTHER PUBLICATIONS

Korean Office Action dated Dec. 14, 2020 issued in corresponding Korean Patent Application No. 10-2015-0134898.

*Primary Examiner* — Jae N Noh
(74) *Attorney, Agent, or Firm* — Harness, Dickey & Pierce, P.L.C.

(57) ABSTRACT

In one example embodiment, a camera system includes a plurality of cameras, a camera controller configured to control the plurality of cameras, a control signal line configured to facilitate an exchange of at least one control signal between the camera controller and the plurality of cameras and a synchronization signal line commonly connected to the plurality of cameras, and configured to transmit at least one transmission synchronization signal for synchronizing at least two cameras among the plurality of cameras.

12 Claims, 14 Drawing Sheets

Related U.S. Application Data continuation of application No. 16/447,199, filed on Jun. 20, 2019, now Pat. No. 10,666,837, which is a continuation of application No. 15/271,868, filed on Sep. 21, 2016, now Pat. No. 10,367,977.

(51) Int. Cl.
*H04N 13/296* (2018.01)
*H04N 5/232* (2006.01)

(58) Field of Classification Search
USPC .......................................................... 348/159
See application file for complete search history.

(56) References Cited

U.S. PATENT DOCUMENTS

| | | | |
|---|---|---|---|
| 5,428,386 A | 6/1995 | D'Alfonso et al. | |
| 6,437,824 B1 | 8/2002 | Suzuki et al. | |
| 8,810,632 B2 | 8/2014 | Hwang et al. | |
| 9,001,229 B2 | 4/2015 | Goh et al. | |
| 2002/0003571 A1 | 1/2002 | Schofield et al. | |
| 2007/0139525 A1 | 6/2007 | Amphlett | |
| 2012/0069407 A1 | 3/2012 | Hasuo et al. | |
| 2012/0257065 A1 | 10/2012 | Velarde et al. | |
| 2015/0029396 A1* | 1/2015 | Scurrell | G11B 27/10 |
| | | | 348/515 |
| 2016/0261807 A1* | 9/2016 | Seshadrinathan | H04N 5/23206 |
| 2017/0054968 A1* | 2/2017 | Woodman | H04N 13/239 |
| 2017/0163871 A1* | 6/2017 | Irie | H04N 5/247 |
| 2017/0257601 A1 | 9/2017 | Catrein et al. | |
| 2019/0014201 A1 | 1/2019 | Bao | |

FOREIGN PATENT DOCUMENTS

| | | |
|---|---|---|
| JP | 2009-071467 A | 4/2009 |
| KR | 10-2012-0010764 A | 2/2012 |
| KR | 2012-0044821 A | 5/2012 |
| KR | 2013-0032782 A | 4/2013 |
| KR | 2013-0092522 A | 8/2013 |

\* cited by examiner

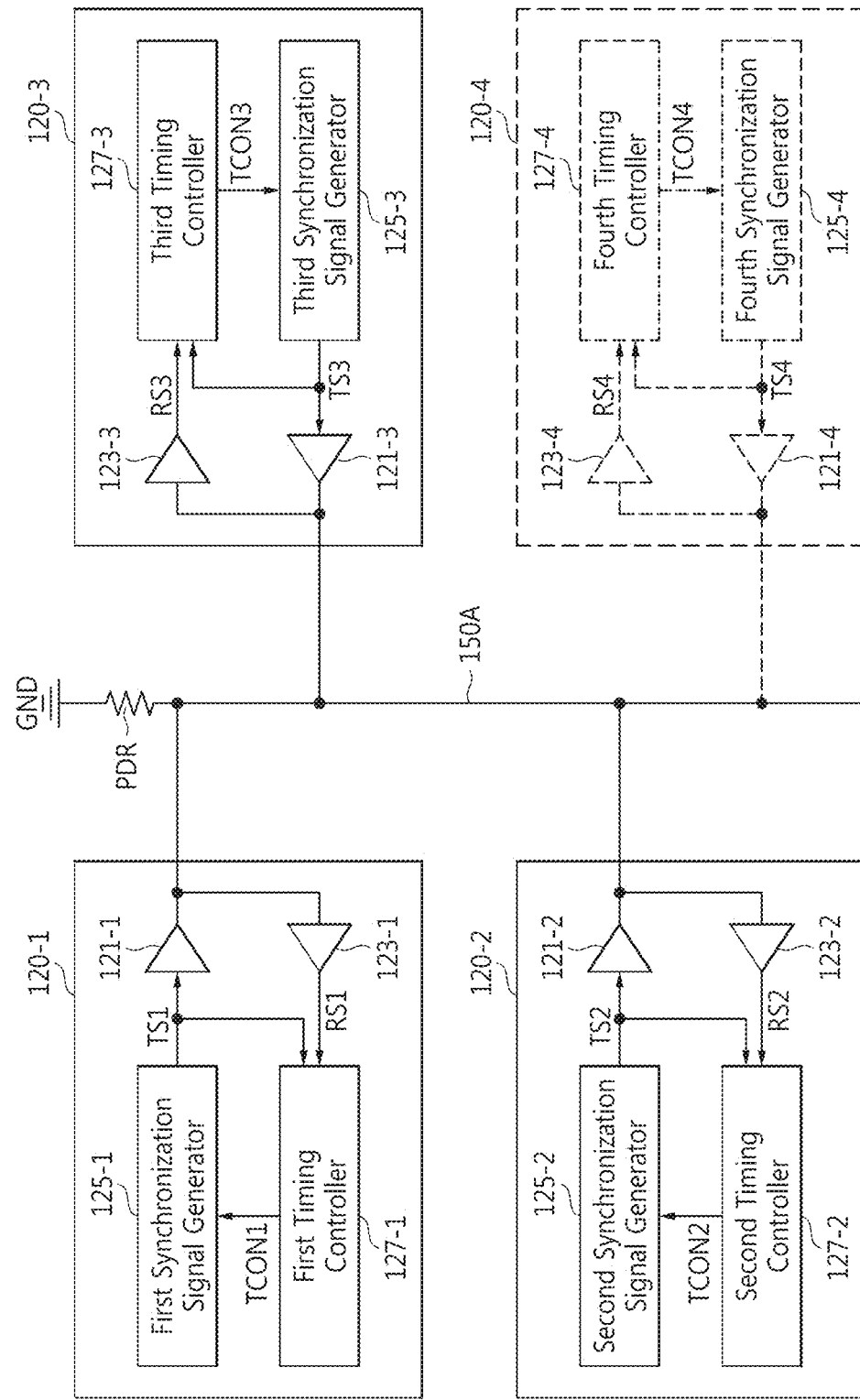

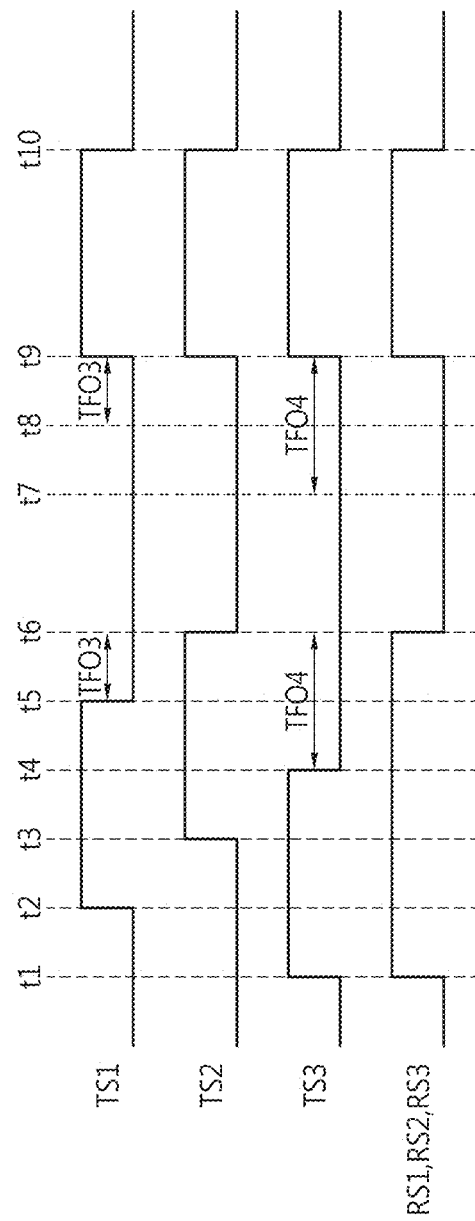

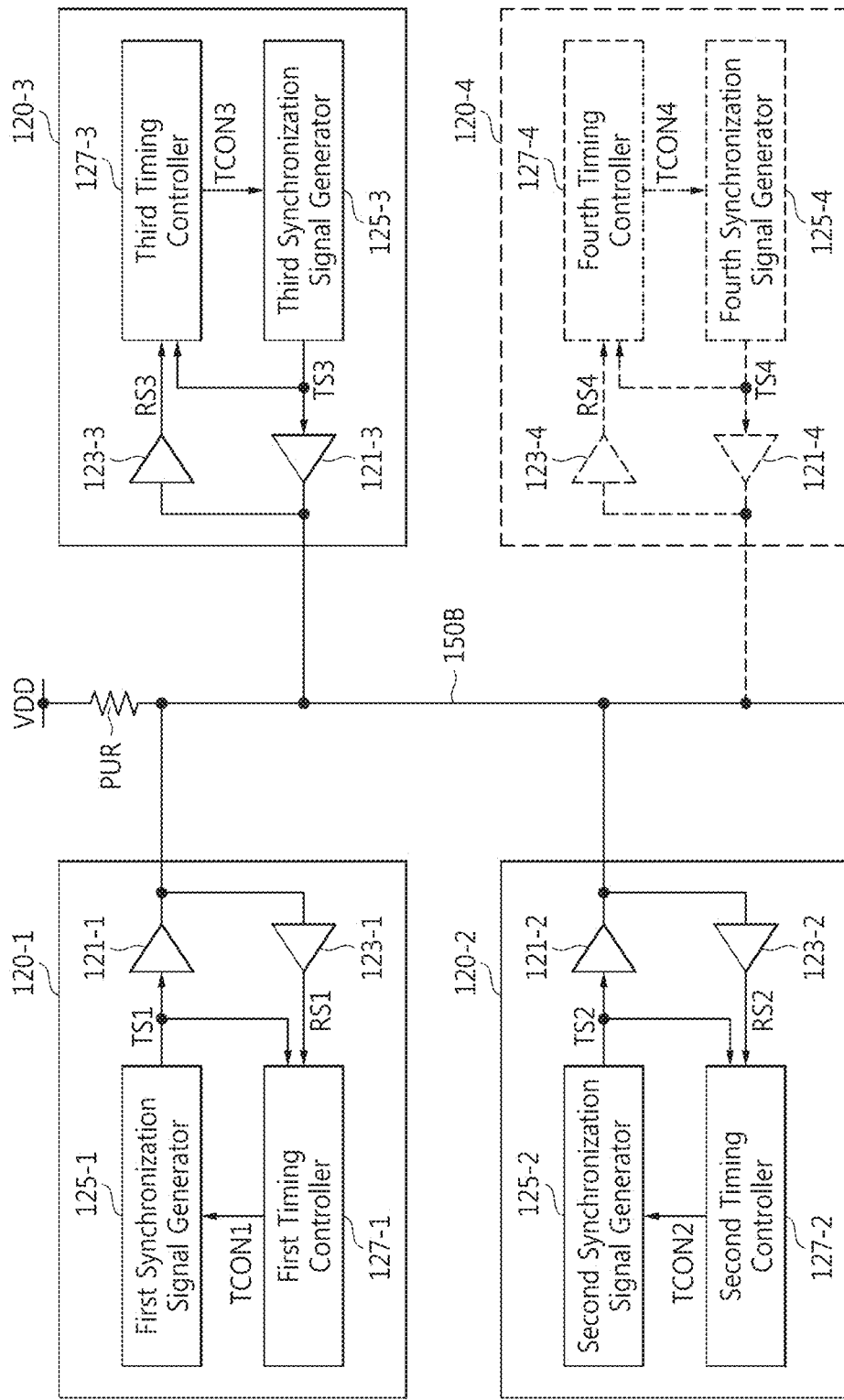

(a)          (b)

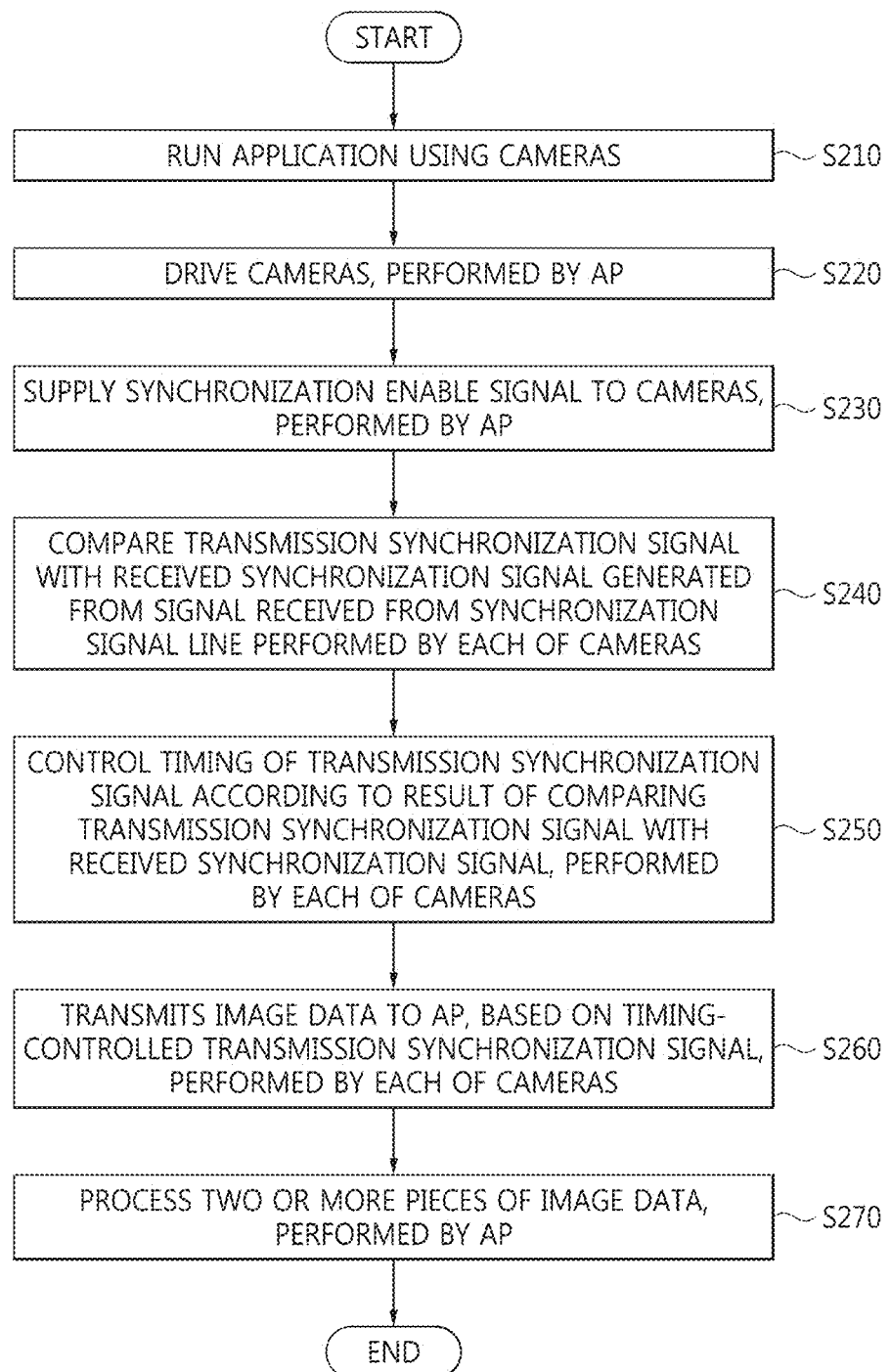

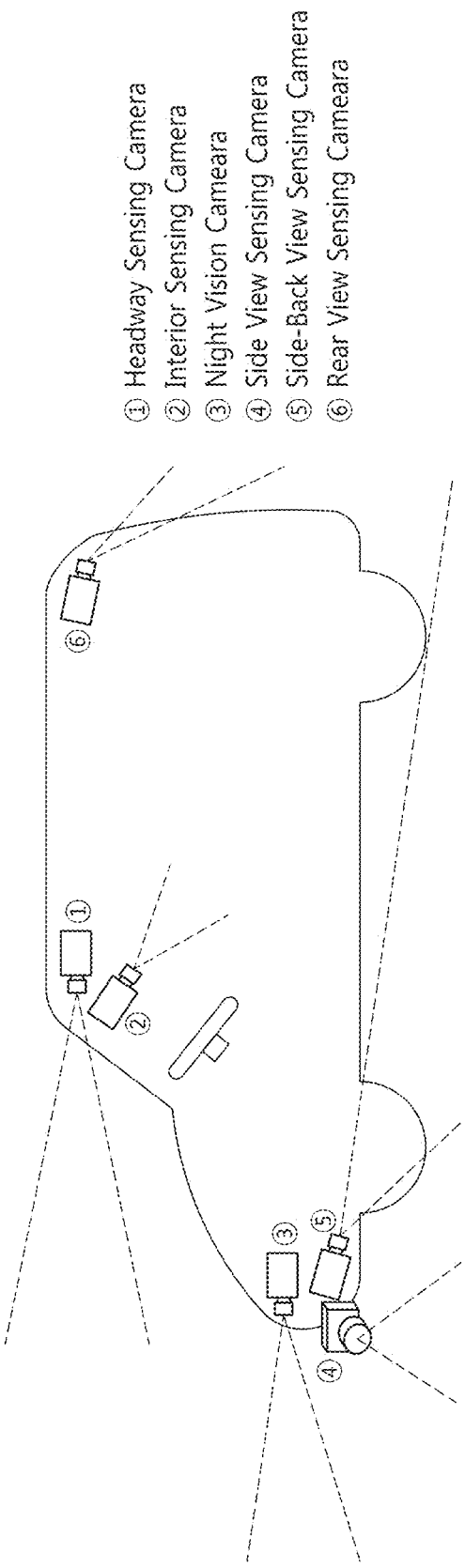

BIDIRECTIONAL SYNCHRONIZING CAMERA, CAMERA SYSTEM INCLUDING THE SAME AND METHOD OF OPERATING THE CAMERA

CROSS-REFERENCE TO RELATED APPLICATION

This application is a continuation of U.S. application Ser. No. 16/815,487, filed on Mar. 11, 2020, which is a continuation of U.S. application Ser. No. 16/447,199, filed on Jun. 20, 2019, now granted as U.S. Pat. No. 10,666,837 on May 26, 2020, which is a continuation of U.S. application Ser. No. 15/271,868, filed on Sep. 21, 2016, now granted as U.S. Pat. No. 10,367,977 on Jul. 30, 2019, which claims the benefit of Korean Patent Application No. 10-2015-0134898, filed on Sep. 23, 2015, in the Korean Intellectual Property Office, the disclosure of each of which is incorporated herein in its entirety by reference.

BACKGROUND

Example embodiments of the inventive concepts relate to a camera system, and more particularly, to a bidirectional synchronizing camera, a camera system including the same, and/or a method of operating the camera system.

With advancement in digital camera technology, a technology or service for simultaneously using at least two cameras has been developed.

In order to simultaneously operate at least two cameras, the at least two cameras should be synchronized with each other. To this end, a method of precisely controlling at least two cameras to synchronize them with each other, performed by one camera control device, has been introduced. Also, a method of preparing separate signal lines for one-to-one synchronization between at least two cameras and synchronizing the at least two cameras with each other by using the separate signal lines has been introduced.

According to the former method, an algorithm or circuit for synchronizing the at least two cameras with each other should be installed in the camera control device. According to the latter method, a connection between the at least two cameras becomes complex as the number of cameras increases, and a reference camera among two cameras should be set beforehand.

SUMMARY

In one example embodiment, a camera system includes a plurality of cameras, a camera controller configured to control the plurality of cameras, a control signal line configured to facilitate an exchange of at least one control signal between the camera controller and the plurality of cameras and a synchronization signal line commonly connected to the plurality of cameras, and configured to transmit at least one transmission synchronization signal for synchronizing at least two cameras among the plurality of cameras.

In yet another example embodiment, each of the plurality of cameras includes a transmitter electrically connected to the synchronization signal line and configured to transmit a corresponding transmission synchronization signal to the synchronization signal line. Each of the plurality of cameras further includes a receiver electrically connected to the synchronization signal line, and configured to receive one or more transmission synchronization signals transmitted by other ones of the plurality of cameras from the synchronization signal line. Each of the plurality of cameras further includes a timing controller configured to receive the corresponding transmission synchronization signal and the received one or more transmission synchronization signals, detect a timing difference between the transmission synchronization signal and the received one or more transmission synchronization signals, and control a timing of the corresponding transmission synchronization signal according to the timing difference.

In yet another example embodiment, the timing controller is configured to detect a time period during which the corresponding transmission synchronization signal and at least one of the received one or more transmission synchronization signals have different levels, and one of advance or delay a point of time when the corresponding transmission synchronization signal is to be enabled, by the detected time period.

In yet another example embodiment, the timing controller is configured to detect a timing difference between one edge of the corresponding transmission synchronization signal and one edge of at least one of the received one or more transmission synchronization signals, and one of advance or delay a point of time when the corresponding transmission synchronization signal is to be enabled, by the detected timing difference.

In yet another example embodiment, the timing controller is configured to determine a count value by counting rising edges or falling edges of an internal clock signal for a time period from the one edge of the corresponding transmission synchronization signal to the one edge of the at least one of the received one or more transmission synchronization signals, and detect the timing difference based on the determined count value.

In yet another example embodiment, the synchronization signal line is selectively electrically connected to a ground voltage source via a pull-down resistor, and has a ground voltage at an initial stage.

In yet another example embodiment, the synchronization signal line is selectively electrically connected to a supply voltage source via a pull-up resistor, and has a supply voltage at an initial stage.

In yet another example embodiment, the plurality of cameras includes a first camera and a second camera, the first camera is configured to output a first transmission synchronization signal to the synchronization signal line, the second camera is configured to output a second transmission synchronization signal to the synchronization signal line, the second transmission synchronization signal is enabled later than the first transmission synchronization signal, and the first camera is configured to detect a timing difference between the second transmission synchronization signal received from the synchronization signal line and the first transmission synchronization signal, and delay a point of time when the first transmission synchronization signal is to be enabled according to the timing difference.

In yet another example embodiment, the plurality of cameras further includes a third camera, the third camera is configured to output a third transmission synchronization signal to the synchronization signal line, the third transmission synchronization signal is enabled earlier than the first transmission synchronization signal, and the third camera is configured to detect a timing difference between at least one of the first and second transmission synchronization signals received from the synchronization signal line and the third transmission synchronization signal, and delay a point of time when the third transmission synchronization signal is to be enabled according to the timing difference.

In yet another example embodiment, the plurality of cameras includes a first camera and a second camera, the first camera is configured to output a first transmission synchronization signal to the synchronization signal line, the second camera is configured to output a second transmission synchronization signal to the synchronization signal line, the second transmission synchronization signal is enabled later than the first transmission synchronization signal, and the second camera is configured to detect a timing difference between the first transmission synchronization signal received from the synchronization signal line and the second transmission synchronization signal, and advance a point of time when the second transmission synchronization signal is to be enabled according to the timing difference.

In yet another example embodiment, the plurality of cameras further includes a third camera, the third camera is configured to output a third transmission synchronization signal to the synchronization signal line, the third transmission synchronization signal is enabled later than the second transmission synchronization signal, and the third camera is configured to detect a timing difference between at least one of the first and second transmission synchronization signals received from the synchronization signal line and the third transmission synchronization signal, and advance a point of time when the third transmission synchronization signal is to be enabled according to the timing difference.

In one example embodiment, a first camera is connected to at least a second camera via a synchronization signal line, the camera includes a transmitter electrically connected to the synchronization signal line and configured to transmit a first transmission synchronization signal to the synchronization signal line and a receiver electrically connected to the synchronization signal line and configured to receive at least a second transmission synchronization signal from the second camera via the synchronization signal line. The first camera further includes a timing controller configured to receive the first transmission synchronization signal and the second transmission synchronization signal, detect a timing difference between the first transmission synchronization signal and the second transmission synchronization signal, and control a timing of the first transmission synchronization signal according to the timing difference.

In yet another example embodiment, the first camera further includes an image sensor configured to sense an image of an object captured by a lens and transmit image data of the sensed image to a camera controller according to the first transmission synchronization signal, under control of the camera controller.

In yet another example embodiment, the timing controller is configured to detect a timing difference between one edge of the first transmission synchronization signal and one edge of the second transmission synchronization signal, and one of advance or delay a point of time when the first transmission synchronization signal is to be enabled according to the detected timing difference.

In yet another example embodiment, the first camera is commonly connected to the second camera and a third camera via the synchronization signal line, and is configured to detect which one of the second camera and the third camera is enabled at a later point of time than the other one of the second camera and the third camera based on the second transmission synchronization signal, and delay a point of time when the first transmission synchronization signal is to be enabled to be synchronized with the later point of time.

In yet another example embodiment, the first camera is commonly connected to the second camera and a third camera via the synchronization signal line, and is configured to detect which one of the second camera and the third camera is enabled at an earlier point of time than the other one of the second camera and the third camera based on the second transmission synchronization signal, and advance a point of time when the first transmission synchronization signal is to be enabled to be synchronized with the earlier point of time.

In yet another example embodiment, the timing controller is configured to determine a count value by counting rising edges or falling edges of an internal clock signal for a time period from one edge of the first transmission synchronization signal to one edge of the second transmission synchronization signal.

In yet another example embodiment, the timing controller is configured to control a timing of the first transmission synchronization signal when the count value is equal to or greater than a minimum value and is less than or equal to a maximum value.

In one example embodiment, a method of operating a camera system including a plurality of cameras connected commonly to a synchronization signal line, includes running an application using the plurality of cameras, driving the plurality of cameras, generating a plurality of transmission synchronization signals and outputting the plurality of transmission synchronization signals to the synchronization signal line, each of the plurality of transmission synchronization signals corresponding to one of the plurality of cameras, and comparing one of the plurality of transmission synchronization signals with other one of the plurality of transmission synchronization signals, and controlling a timing of the one of the plurality of transmission synchronization signals based on a result of the comparing.

In yet another example embodiment, the method further includes transmitting image data to the application processor based on the transmission synchronization signal, receiving at least two pieces of synchronized image data from the plurality of cameras, and processing the at least two pieces of synchronized image data.

In yet another example embodiment, the plurality of cameras includes a first camera and a second camera, the generating of the plurality of transmission synchronization signals and outputting of the plurality of transmission synchronization signals to the synchronization signal line includes outputting a first transmission synchronization signal to the synchronization signal line, and outputting a second transmission synchronization signal to the synchronization signal line. The second transmission synchronization signal is enabled later than the first transmission synchronization signal, and the controlling of the timing of the transmission synchronization signal includes detecting a timing difference between the first transmission synchronization signal and the second transmission synchronization signal, and delaying a point of time when the first transmission synchronization signal is to be enabled according to the timing difference.

In yet another example embodiment, the plurality of cameras further includes a third camera, and the generating of the plurality of transmission synchronization signals and outputting of the plurality of transmission synchronization signals to the synchronization signal line further includes outputting a third transmission synchronization signal to the synchronization signal line. The third transmission synchronization signal is enabled earlier than the first transmission synchronization signal, and the controlling of the timing of the transmission synchronization signal further includes detecting a timing difference between the third transmission synchronization signal and the first and second transmission synchronization signals and delaying a point of time when the third transmission synchronization signal is to be enabled according to the timing difference.

In yet another example embodiment, the plurality of cameras includes a first camera and a second camera, the generating of the plurality of transmission synchronization signals and outputting of the plurality of transmission synchronization signals to the synchronization signal line includes, outputting a first transmission synchronization signal to the synchronization signal line, and outputting a second transmission synchronization signal to the synchronization signal line. The second transmission synchronization signal is enabled later than the first transmission synchronization signal, and the controlling of the timing of the plurality of transmission synchronization signals includes detecting a timing difference between the first transmission synchronization signal and the second transmission synchronization signal, and advancing a point of time when the second transmission synchronization signal is to be enabled according to the timing difference.

In yet another example embodiment, the plurality of cameras further includes a third camera, the generating of the plurality of transmission synchronization signals and outputting of the plurality of transmission synchronization signals to the synchronization signal line further includes outputting a third transmission synchronization signal to the synchronization signal line, the third transmission synchronization signal being enabled later than the second transmission synchronization signal, and the controlling of the timing of the plurality of transmission synchronization signals includes detecting a timing difference between the third transmission synchronization signal and the first and second transmission synchronization signals, and advancing a point of time when the third transmission synchronization signal is to be enabled according to the timing difference.

In one example embodiment, a method of operating a first camera connected to a camera controller via a control signal line and connected to at least a second camera via a synchronization signal line, includes generating a first transmission synchronization signal according to a synchronization enable signal supplied from the camera controller, outputting the first transmission synchronization signal to the synchronization signal line, receiving a second transmission synchronization signal from the synchronization signal line, detecting a timing difference between a first rising edge or a first falling edge of the first transmission synchronization signal and a second rising edge or a second falling edge of the second transmission synchronization signal and controlling a timing of the first transmission synchronization signal according to the detected timing difference.

In yet another example embodiment, the method further includes generating image data by sensing an image of an object captured by a lens and transmitting the image data to the camera controller via a data line by using the first transmission synchronization signal.

In one example embodiment, a device includes a plurality of cameras, each of the plurality of cameras being configured to generate a first transmission synchronization signal, receive at least one a second transmission synchronization signal from at least another one of the plurality of cameras, and adjust a timing of the first transmission synchronization signal based on a timing difference between the first transmission synchronization signal and the second transmission synchronization signal.

In yet another example embodiment, each of the plurality of cameras is configured to adjust the timing of the first transmission synchronization signal by one of delaying or advancing a point of time at which the first transmission synchronization signal is to be enabled, based on whether the first transmission synchronization signal is enabled before or after the second transmission synchronization signal.

In yet another example embodiment, each of the plurality of cameras is configured to determine the timing difference based on a count value corresponding to rising or falling edges of an internal clock signal from one edge of the first transmission synchronization signal to one edge of the second transmission synchronization signal.

In yet another example embodiment, each of the plurality of cameras is configured to receive the second transmission synchronization signal from a transmission synchronization line connecting the plurality of cameras.

In yet another example embodiment, each of the plurality of cameras includes an image sensor configured to sense an image of an object and transmit image data of the sensed image to a processor according to the adjusted timing of the first transmission synchronization signal.

BRIEF DESCRIPTION OF THE DRAWINGS

Example embodiments of the inventive concepts will be more clearly understood from the following detailed description taken in conjunction with the accompanying drawings in which:

FIG. 6A is a diagram illustrating an operation of a camera system, according to an example embodiment;

FIG. 6B is a schematic signal timing diagram of the camera system of FIG. 6A, according to an example embodiment;

FIG. 7A is a diagram illustrating an operation of a camera system, according to an example embodiment;

FIG. 11 is a flowchart of a method of operating a camera, according to an example embodiment; and FIG. 12 is a diagram illustrating a case in which a camera system is applied to a vehicle, according to an example embodiment.

DETAILED DESCRIPTION OF EXAMPLE EMBODIMENTS

Figure 1:
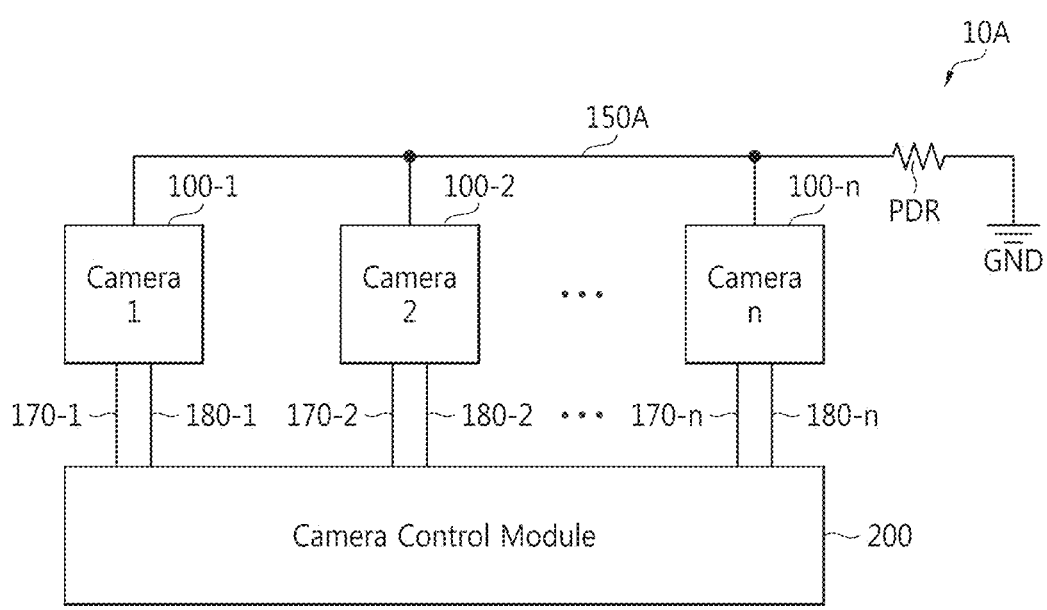
FIG. 1 is a schematic block diagram of a camera system, according to an example embodiment.

The inventive concepts now will be described more fully hereinafter with reference to the accompanying drawings, in which example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, the inventive concepts will be described in greater detail by explaining example embodiments thereof with reference to the accompanying drawings.

FIG. 1 is a schematic block diagram of a camera system, according to an example embodiment. Referring to FIG. 1, a camera system 10A includes a plurality of cameras 100-1 to 100-$n$, and a camera control module 200 configured to control the plurality of cameras 100-1 to 100-$n$. Here, 'n' denotes an integer which is equal to or greater than '2'.

In one example embodiment, the camera system 10A further includes control signal lines 170-1 to 170-$n$ configured to exchange a control signal between the camera control module 200 and the plurality of cameras 100-1 to 100-$n$, and data lines 180-1 to 180-$n$ configured to exchange data between the camera control module 200 and the plurality of cameras 100-1 to 100-$n$.

In one example embodiment, the camera system 10A further includes a synchronization signal line 150A commonly connected to the plurality of cameras 100-1 to 100-$n$. The synchronization signal line 150A transmits a synchronization signal for synchronizing operations of at least two cameras among the plurality of cameras 100-1 to 100-$n$ with each other.

In one example embodiment, the control signal lines 170-1 to 170-$n$ are respectively provided for the plurality of cameras 100-1 to 100-$n$ and the data lines 180-1 to 180-$n$ are also respectively provided for the plurality of cameras 100-1 to 100-$n$, but the synchronization signal line 150A may be commonly connected to all of the plurality of cameras 100-1 to 100-$n$.

The synchronization signal line 150A may be connected to a ground voltage GND source via a pull-down resistor PDR. In this case, the synchronization signal line 150A is initialized to a ground voltage GND.

The camera control module 200 may control operations of the plurality of cameras 100-1 to 100-$n$, and receive image data from the plurality of cameras 100-1 to 100-$n$ and process the image data. In one example embodiment, the camera control module 200 may be embodied as a microcontroller unit (MCU), a processor, a system-on-chip including at least one processor, etc. but is not limited thereto. When the camera control module 200 is a processor, the processor may have an associated memory (not shown) in which computer-readable instructions are stored. The execution of the computer-readable instructions by the processor, transforms the processor into a special purpose processor for carrying out the functionalities of the camera control module 200, as is described herein.

Figure 2:
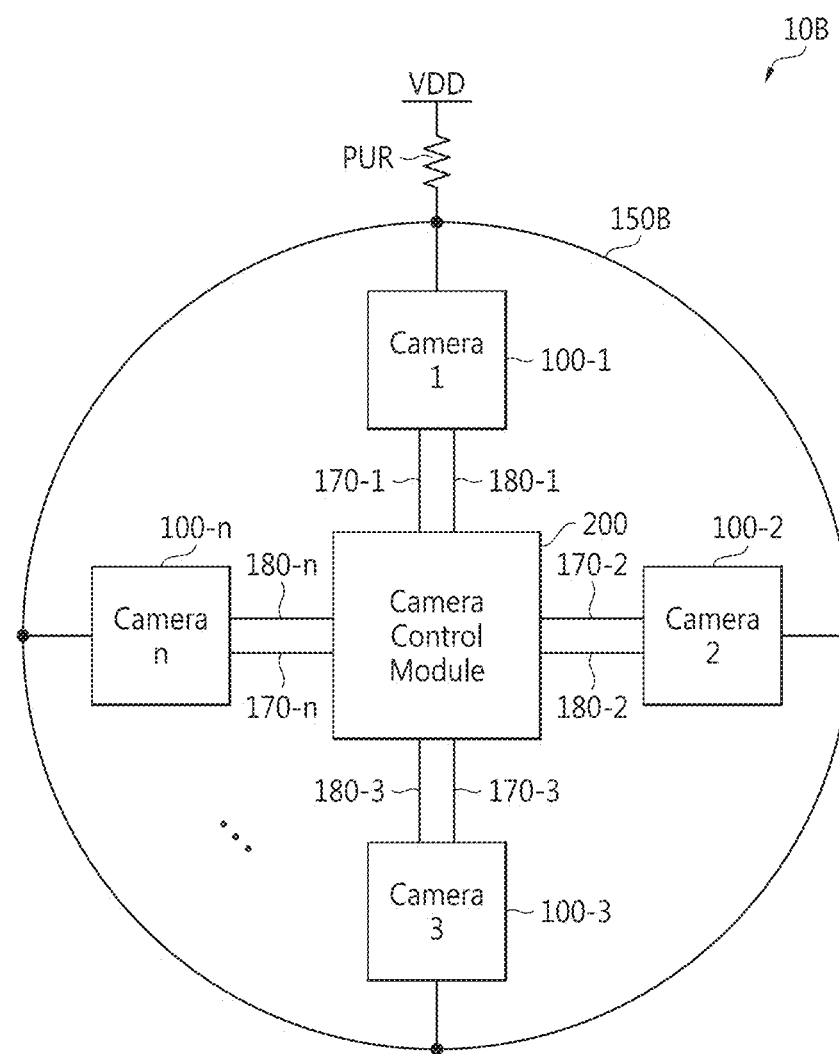
FIG. 2 is a schematic block diagram of a camera system, according to an example embodiment.

FIG. 2 is a schematic block diagram of a camera system, according to an example embodiment. Referring to FIG. 2, a camera system 10B includes a plurality of cameras 100-1 to 100-$n$, a camera control module 200, control signal lines 170-1 to 170-$n$, data lines 180-1 to 180-$n$, and a synchronization signal line 150B, similar to the camera system 10A of FIG. 1.

In one example embodiment, the camera system 10B of FIG. 2 has substantially the same structure and operation as the camera system 10A of FIG. 1 and will be thus described focusing on the differences from the camera system 10A of FIG. 1 to avoid a redundant description.

In the example embodiment of FIG. 2, the synchronization signal line 150B may be connected to a supply voltage VDD source via a pull-up resistor (PUR). In this case, the synchronization signal line 150B is initialized to a supply voltage VDD.

As illustrated in FIGS. 1 and 2, different arrangements of the plurality of cameras 100-1 to 100-$n$ and different layouts of the synchronization signal lines 150A and 150B are variable. For example, each of the synchronization signal lines 150A and 150B may be formed on one printed circuit board (PCB) but inventive concepts are not limited thereto.

In one example embodiment, each of the camera systems 10A and 10B may further include other elements, such as a memory, a display device, a temperature sensor, etc.

Figure 3:
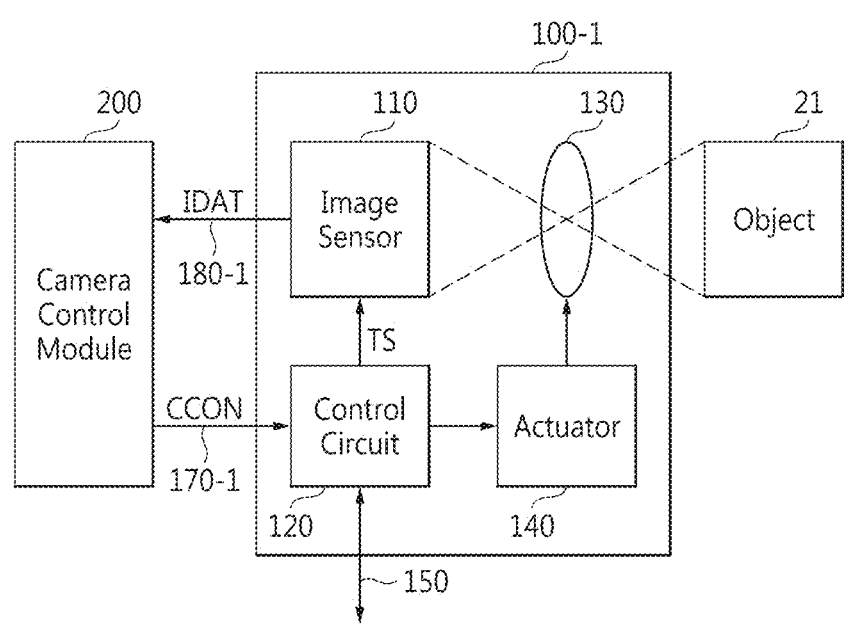
FIG. 3 is a schematic block diagram of a camera illustrated in FIG. 1 and/or FIG. 2, according to an example embodiment.

FIG. 3 is a schematic block diagram of a camera illustrated in FIG. 1 and/or FIG. 2, according to an example embodiment. Although FIG. 3 illustrates the camera 100-1 as a representative example among the plurality of cameras 100-1 to 100-$n$ illustrated in FIGS. 1 and 2, the other cameras 100-2 to 100-$n$ may have the same structure as the camera 100-1 illustrated in FIG. 3.

The camera 100-1 may include an image sensor 110, a control circuit 120, a lens 130, and an actuator 140.

The image sensor 110 may be operated to generate image information under the control of the camera control module 200.

The image sensor 110 may transmit sensed image data IDAT obtained by sensing an image of an object 21 captured by the lens 130 to the camera control module 200, under control of the camera control module 200. The camera control module 200 may process the image data IDAT sensed by the image sensor 110, and store a result of processing the image data IDAT in a memory (not shown) or output it to a display device (not shown).

The control circuit 120 may control the image sensor 110 and the actuator 140 according to a control signal CCON received from the camera control module 200. For example, the control circuit 120 may adjust the position of the lens 130 by controlling the actuator 140 according to a location control signal among examples of the control signal CCON received from the camera control module 200. In one example embodiment, the control circuit 120 is a processor. The processor may have an associated memory (not shown) in which computer-readable instructions are stored. The execution of the computer-readable instructions by the processor, transforms the processor into a special purpose processor for carrying out the functionalities of the control circuit 120, as is described herein.

Examples of the control signal CCON may include a synchronization enable signal. The synchronization enable signal may be a signal for controlling the camera 100-1 to be operated in synchronization with at least another camera (e.g., the camera 100-2).

The control circuit 120 may generate and output a transmission synchronization signal TS. The image sensor 110 may transmit the image data IDAT to the camera control module 200 according to the transmission synchronization signal TS.

In one example embodiment, the lens 130 includes a lens for bringing the camera 100-1 into a focus. In one example embodiment, the lens 130 may further include a lens for collecting light, a lens for dispersing light, or the like.

The actuator 140 may adjust the position of the lens 130. For example, the actuator 140 may focus the lens 130 of the camera 100-1 by adjusting the position of the lens 130.

In FIG. 3, the synchronization signal line 150 may be substantially the same as the synchronization signal line 150A connected to the ground voltage GND source as illustrated in FIG. 1 or as the synchronization signal line 150B connected to the supply voltage VDD source as illustrated in FIG. 2.

Figure 4:
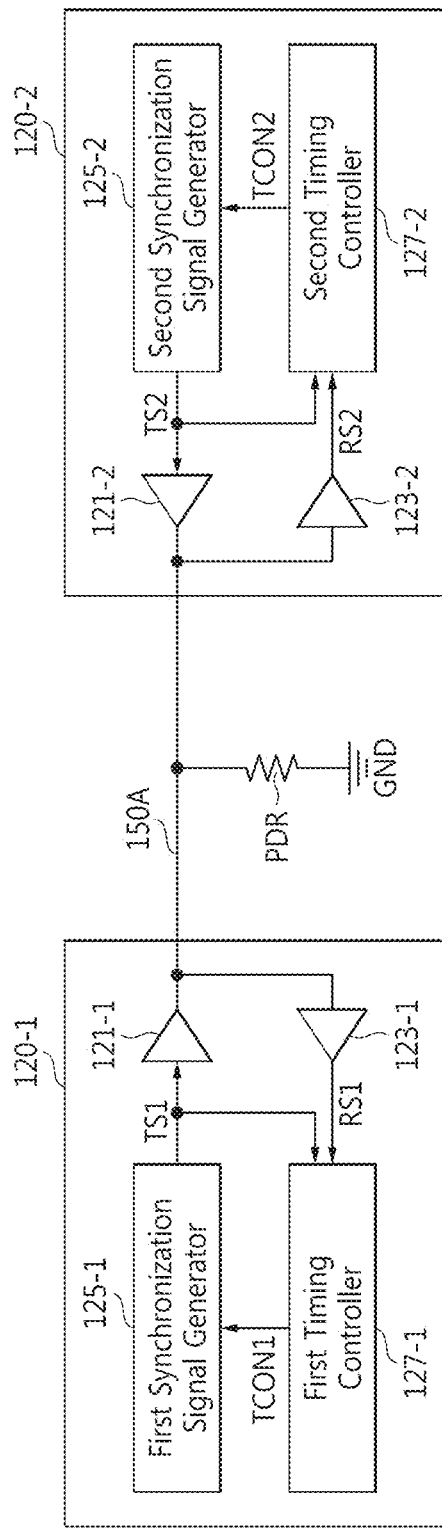
FIG. 4 is a diagram illustrating an operation of a camera system, according to an example embodiment.
Figure 5A:
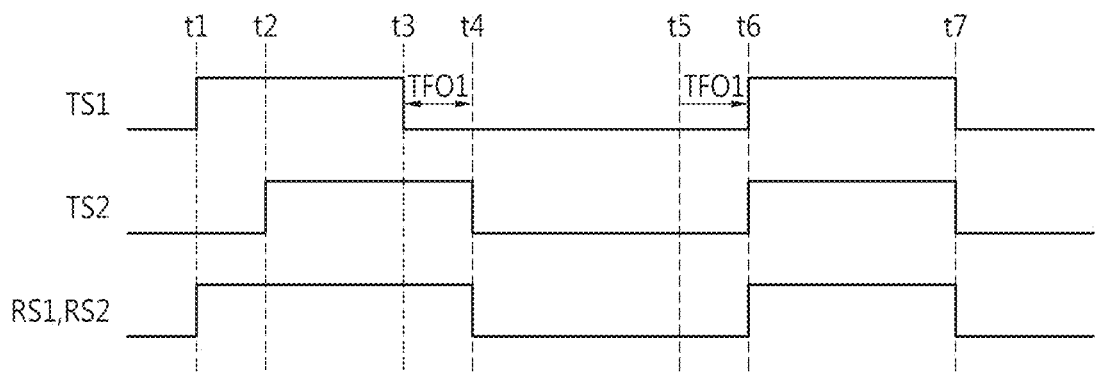
FIG. 5A is a schematic signal timing diagram of the camera system of FIG. 4, according to an example embodiment.
Figure 5B:
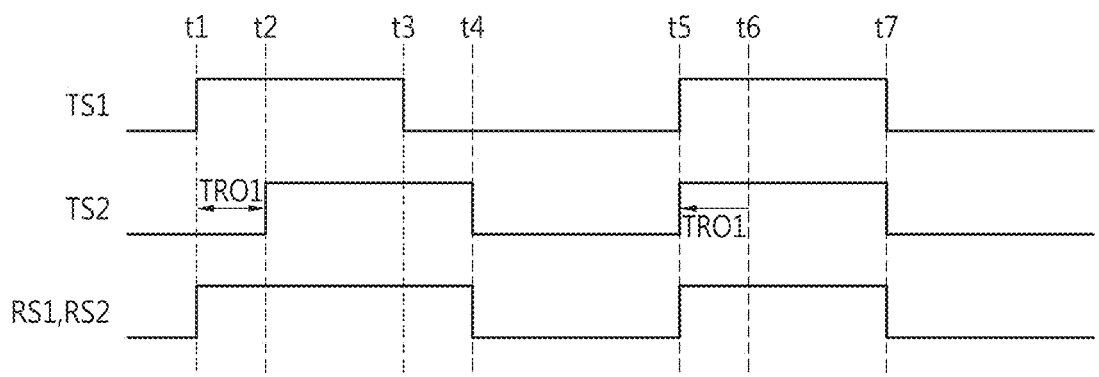
FIG. 5B is a schematic signal timing diagram of the camera system of FIG. 4, according to an example embodiment.

FIG. 4 is a diagram illustrating an operation of a camera system, according to an example embodiment. FIG. 5A is a schematic signal timing diagram of the camera system of FIG. 4, according to an example embodiment. FIG. 5B is a schematic signal timing diagram of the camera system of FIG. 4, according to an example embodiment.

In the embodiments of FIGS. 4 to 5B, only the first and second cameras 100-1 and 100-2 commonly connected to the synchronization signal line 150A are illustrated for convenience of explanation, but other cameras may be further commonly connected to the synchronization signal line 150A.

In one example embodiment, a first control circuit 120-1 of the first camera 100-1 includes a first transmitter 121-1, a first receiver 123-1, a first synchronization signal generator 125-1, and a first timing controller 127-1.

The first transmitter 121-1 is electrically connected to the synchronization signal line 150A, and transmits a first transmission synchronization signal TS1 to the synchronization signal line 150A.

The first receiver 123-1 is electrically connected to the synchronization signal line 150A, and receives a first synchronization signal RS1 from the synchronization signal line 150A. In one example embodiment, the first synchronization signal RS1 is a transmission synchronization signal generated by the second control circuit 120-2 (denoted as TS2), which is transmitted by the second control circuit 120-2 to the synchronization signal line 150A and subsequently received by the receiver 123-1. In one example embodiment, the first synchronization signal RS1 may also be referred to as the first received synchronization signal RS1.

While in example embodiments described herein RS1 is the TS2 transmitted by the second control circuit 120-2, in one example embodiment, if TS2 is transmitted in a different format or over a different communication channel such that without performing a transformation or signal processing on TS2, the first control circuit 120-1 cannot obtain/retrieve TS2 as RS1, the first control circuit 120-1 may generate RS1 from TS2 by performing the appropriate underlying signal processing/transformation.

That is, the first transmitter 121-1 and the first receiver 123-1 are commonly connected to one synchronization signal line 150A. The synchronization signal line 150A may be connected to a ground voltage GND source via a pull-down resistor (PDR).

The first timing controller 127-1 receives the first transmission synchronization signal TS1 and the first received synchronization signal RS1, and detects a timing difference between the first transmission synchronization signal TS1 and the first received synchronization signal RS1. The first timing controller 127-1 may output a first timing control signal TCON1 for controlling a timing of the first transmission synchronization signal TS1 according to the detected timing difference.

For example, the first timing controller 127-1 may detect a time period during which the first transmission synchronization signal TS1 and the first received synchronization signal RS1 have different levels, and output the first timing control signal TCON1 for advancing or delaying a point of time when the first transmission synchronization signal TS1 is to be output by the detected time period.

For example, the first timing controller 127-1 may detect a time period between a rising edge of the first transmission synchronization signal TS1 and a rising edge of the first received synchronization signal RS1 or a time period between a falling edge of the first transmission synchronization signal TS1 and a falling edge of the first received synchronization signal RS1.

In one example embodiment, the first timing controller 127-1 may detect the timing difference by calculating a count value through counting rising edges or falling edges of an internal clock signal (not shown) for a time period from a rising edge of the first transmission synchronization signal TS1 to a rising edge of the first received synchronization signal RS1.

In one example embodiment, the first synchronization signal generator 125-1 generates and outputs the first transmission synchronization signal TS1. The point of time when the first transmission synchronization signal TS1 is to be output may be controlled according to the first timing control signal TCON1.

In one example embodiment, a second control circuit 120-2 of the second camera 100-2 has substantially the same structure as the first control circuit 120-1. The second control circuit 120-2 includes a second transmitter 121-2, a second receiver 123-2, a second synchronization signal generator 125-2, and a second timing controller 127-2.

In one example embodiment, the second transmitter 121-2 is electrically connected to the synchronization signal line 150A, and transmits a second transmission synchronization signal TS2 to the synchronization signal line 150A.

In one example embodiment, the second receiver 123-2 is electrically connected to the synchronization signal line 150A, and receives a second synchronization signal RS2 from the synchronization signal line 150A. In one example embodiment, the RS2 is the TS1 generated by the first control circuit 120-1 and transmitted to the circuit control circuit 120-2 via the synchronization signal line 150A.

While in example embodiments described herein RS2 is the TS1 transmitted by the first control circuit 120-1, in one example embodiment, if TS1 is transmitted in a different format or over a different communication channel such that without performing a transformation or signal processing on TS1, the second control circuit 120-2 cannot obtain/retrieve TS1 as RS2, the second control circuit 120-2 may generate RS2 from TS1 by performing the appropriate underlying signal processing/transformation. The same may apply to RS3, which is described below.

In one example embodiment, the second timing controller 127-2 receives the second transmission synchronization signal TS2 and a second received synchronization signal RS2, and detects a timing difference between the second transmission synchronization signal TS2 and the second received synchronization signal RS2. The second timing controller 127-2 may output a second timing control signal TCON2 for controlling a timing of the second transmission synchronization signal TS2 according to the detected timing difference. An operation and function of the second timing controller 127-2 may be the same as those of the first timing controller 127-1.

In one example embodiment, the second synchronization signal generator 125-2 generates and outputs the second transmission synchronization signal TS2. A point of time when the second transmission synchronization signal TS2 is to be output may be controlled according to the second timing control signal TCON2.

Referring to FIG. 5A, the synchronization signal line 150A is electrically connected to the ground voltage GND source and thus has a ground voltage GND at an initial stage, e.g., before a point of time t1.

In one example embodiment, if the first control circuit 120-1 first enables the first transmission synchronization signal TS1 to a logic high level at the first point of time t1 in a state in which the synchronization signal line 150A has the ground voltage GND, i.e., a logic low level, the first synchronization signal line 150A goes logic high according to the first transmission synchronization signal TS1. Thus, the first and second received synchronization signals RS1 and RS2 output from the first receiver 123-1 and the second receiver 123-2, respectively, also go logic high. In FIGS. 5A and 5B, for convenience of explanation, signal delays in the first and second transmitters 121-1 and 121-2, the first and second receivers 123-1 and 123-2, and the synchronization signal line 150A are not taken into account.

Furthermore, in FIG. 5A the second control circuit 120-2 enables the second transmission synchronization signal TS2 to a logic high level at a second point of time t2. If it is assumed that enable periods (e.g., logic high periods) of the first transmission synchronization signal TS1 and the second transmission synchronization signal TS2 are the same, the first control circuit 120-1 may disable the first transmission synchronization signal TS1 to a logic low level at a third point of time t3 and the second control circuit 120-2 may disable the second transmission synchronization signal TS2 to a logic low level at a fourth point of time t4.

Accordingly, the first and second received synchronization signals RS1 and RS2 go logic low at the fourth point of time t4 according to the second transmission synchronization signal TS2 which is disabled to the logic low level at a relatively late point of time.

In one example embodiment, the first timing controller 127-1 may detect a timing difference TFO1 between a falling edge of the first transmission synchronization signal TS1 and a falling edge of the first received synchronization signal RS1, and output the first timing control signal TCON1 for delaying a point of time when the first transmission synchronization signal TS1 is to be enabled by the timing difference TFO1. Thus, the first synchronization signal generator 125-1 may output the first transmission synchronization signal TS1 having the same timing as the second transmission synchronization signal TS2 by delaying a subsequent point of time when the first transmission synchronization signal TS1 is to be enabled to a sixth point of time t6 rather than a fifth point of time t5.

A timing difference between a falling edge of the second transmission synchronization signal TS2 and a falling edge of the second received synchronization signal RS2, which is detected by the second timing controller 127-2, may be '0' or a value approximating '0'. Thus, the timing of the second transmission synchronization signal TS2 is not controlled.

In one example embodiment, the first and second timing controllers 127-1 and 127-2 may respectively control the timings of the first and second transmission synchronization signals TS1 and TS2 corresponding thereto when the detected timing difference is in a desired (and/or alternatively, predetermined) range, i.e., when the detected timing difference is equal to or greater than a desired (and/or alternatively, predetermined) minimum value and is less than or equal to a desired (and/or alternatively, predetermined) maximum value.

Referring to FIG. 5B, the first timing controller 127-1 may detect a timing difference between a rising edge of the first transmission synchronization signal TS1 and a rising edge of the first received synchronization signal RS1, and the second timing controller 127-2 may detect a timing difference TRO1 between a rising edge of the second transmission synchronization signal TS2 and a rising edge of the second received synchronization signal RS2.

The timing difference between the rising edge of the first transmission synchronization signal TS1 and the rising edge of the first received synchronization signal RS1, which is detected by the first timing controller 127-1, may be '0' or a value approximating '0'. Thus, the timing of the first transmission synchronization signal TS1 is not controlled.

In one example embodiment, the second timing controller 127-2 may output the second timing control signal TCON2 for advancing the second transmission synchronization signal TS2 by the timing difference TRO1 according to the timing difference TRO1 between the rising edge of the second transmission synchronization signal TS2 and the rising edge of the second received synchronization signal RS2. Thus, the second synchronization signal generator 125-2 may output the second transmission synchronization signal TS2 having the same timing as the first transmission synchronization signal TS1 by advancing a subsequent point of time when the second transmission synchronization signal TS2 is to be enabled to the fifth point of time t5 rather than the sixth point of time t6.

As described above, each of the first control circuit 120-1 of the first camera 100-1 and the second control circuit 120-2 of the second camera 100-2 may synchronize the timing of a transmission synchronization signal thereof with that of a transmission synchronization signal of the other camera by detecting a timing difference between the transmission synchronization signal and a received synchronization signal thereof (i.e., signals appearing in a synchronization signal line) and advancing or delaying the transmission synchronization signal thereof. Thus, operations of at least two cameras may be synchronized with each other.

According to an example embodiment of the inventive concepts, any one of the cameras commonly connected to the synchronization signal line 150A may be used as a reference camera. For example, a transmission synchronization signal of a camera that starts to operate at a relatively earliest point of time may be delayed with respect to, as a reference camera, a camera starting to operate at a relatively latest point of time (e.g., a camera enabling a transmission synchronization signal at a latest point of time), thereby synchronizing operational timings of all of cameras with one another.

In one example embodiment, a transmission synchronization signal of a camera that starts to operate at a relatively latest point of time may be advanced with respect to, as a reference camera, a camera starting to operate at a relatively earliest point of time (e.g., a camera enabling a transmission synchronization signal at an earliest point of time), thereby synchronizing operational timings of all of cameras with one another.

As described above, according to an example embodiment of the inventive concepts, operations of remaining cameras may be automatically synchronized with one camera as a reference camera. Thus, a plurality of cameras may be synchronized with one another without any intervention of the camera control module 200 or with a minimum intervention of the camera control module 200 (e.g., by supplying a synchronization enable signal using the camera control module 200).

Also, as described above, a plurality of cameras are connected to one synchronization signal line. Thus, even if the number of the plurality of cameras is large, a connection between the plurality of cameras is not complex. Also, the plurality of cameras may be synchronized with a camera starting to operate at a relatively earliest point of time or at a relatively latest point of time among the plurality of cameras. Thus, one of the plurality of cameras need not be set beforehand as a reference camera.

FIG. 6A is a diagram illustrating an operation of a camera system, according to an example embodiment. FIG. 6B is a schematic signal timing diagram of the camera system of FIG. 6A, according to an example embodiment.

In the example embodiments of FIGS. 6A and 6B, it is assumed for convenience of explanation that first to fourth cameras 100-1 to 100-4 are connected to a synchronization signal line 150A but only the first to third cameras 100-1 to 100-3 are in an operational state and the fourth camera 100-4 is in a non-operational state.

In one example embodiment, a structure and operation of each of the first to fourth control circuits 120-1 to 120-4 is substantially the same as those of the first control circuit 120-1 described above with reference to FIG. 4 and are thus not described here to avoid a redundant description.

Referring to FIGS. 6A and 6B, the synchronization signal line 150A is electrically connected to a ground voltage GND source via a pull-down resistor (PDR) and thus has a ground voltage GND (i.e., a logic low level) at an initial stage (e.g., before a point of time t1).

In one example embodiment, if a third control circuit 120-3 first enables a third transmission synchronization signal TS3 to a logic high level at the first point of time t1 in a state in which the synchronization signal line 150A has the ground voltage GND (i.e., the logic low level), the synchronization signal line 150A goes logic high according to the third transmission synchronization signal TS3. Thus, first to third received synchronization signals RS1, RS2, and RS3 output from first to third receivers 123-1 to 123-3 also go logic high. In FIGS. 6A and 6B, signal delays in first to third transmitters 121-1, 121-2, and 121-3, the first to third receivers 123-1, 123-2, 123-3, and the synchronization signal line 150A are not taken into account for convenience of explanation.

In one example embodiment, a first control circuit 120-1 enables a first transmission synchronization signal TS1 to a logic high level at a second point of time t2, and a second control circuit 120-2 enables a second transmission synchronization signal TS2 to a logic high level at a third point of time t3. If it is assumed that enable periods (e.g., logic high periods) of first to third transmission synchronization signal TS1 to TS3 are the same, the third transmission synchronization signal TS3, the first transmission synchronization signal TS1, and the second transmission synchronization signal TS2 are respectively disabled at fourth, fifth and sixth points of time t4, t5, and t6.

The first to third received synchronization signals RS1 to RS3 go logic low at the sixth point of time t6 according to the second transmission synchronization signal TS2 disabled to a logic low level at a latest point of time.

A first timing controller 127-1 may detect a timing difference TFO3 between a falling edge of a first transmission synchronization signal TS1 and a falling edge of the first received synchronization signal RS1, and output a first timing control signal TCON1 for delaying a point of time when the first transmission synchronization signal TS1 is to be enabled by the timing difference TFO3. Thus, a first synchronization signal generator 125-1 may output the first transmission synchronization signal TS1 having the same timing as a second transmission synchronization signal TS2 by delaying a subsequent point of time when the first transmission synchronization signal TS1 is to be enabled by the timing difference TFO3.

In one example embodiment, a timing difference between a falling edge of the second transmission synchronization signal TS2 and a falling edge of the second received synchronization signal RS2, which is detected by a second timing controller 127-2, may be '0' or a value approximating '0'. Thus, the timing of the second transmission synchronization signal TS2 is not controlled.

A third timing controller 127-3 may detect a timing difference TFO4 between a falling edge of a third transmission synchronization signal TS3 and a falling edge of the third received synchronization signal RS3, and output a third timing control signal TCON3 for delaying a point of time when the third transmission synchronization signal TS3 is to be enabled by the detected timing difference TFO4. Thus, a third synchronization signal generator 125-3 may output the third transmission synchronization signal TS3 having the same timing as the second transmission synchronization signal TS2 by delaying a subsequent point of time when the third transmission synchronization signal TS3 is to be enabled by the detected timing difference TFO4.

In the example embodiments of FIGS. 6A and 6B, operational timings of all of cameras are synchronized with one another by delaying a transmission synchronization signal of a camera starting to operate at a relatively earliest point of time with respect to, as a reference camera, a camera starting to operate at a relatively latest point of time (e.g., a camera enabling a transmission synchronization signal at a latest point of time).

However, as described above, operational timings of all of cameras may be synchronized with one another by advancing a transmission synchronization signal of a camera starting to operate at a relatively latest point of time with respect to, as a reference camera, a camera starting to operate at a relatively earliest point of time (e.g., a camera enabling a transmission synchronization signal at a relatively earliest point of time).

Figure 7B:
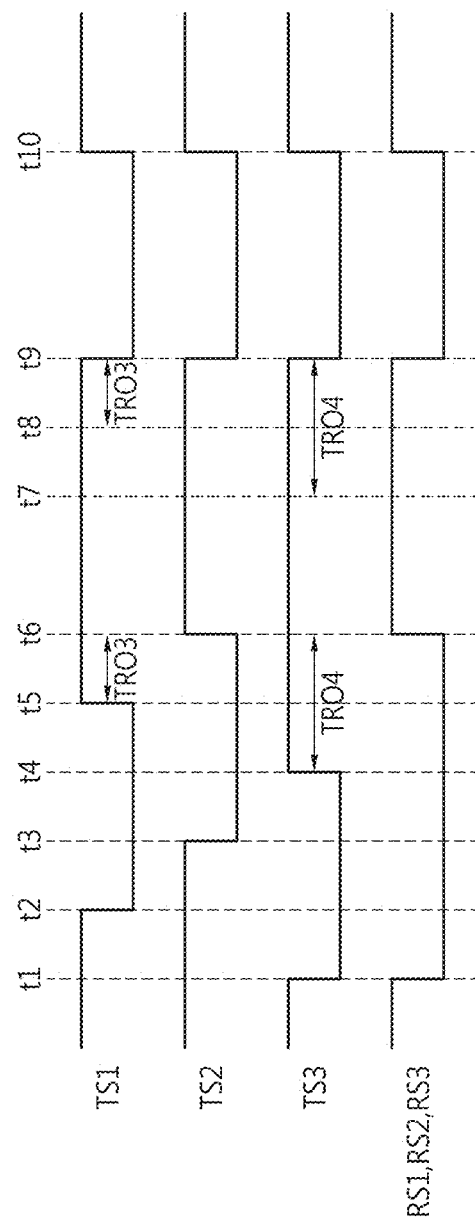
FIG. 7B is a schematic signal timing diagram of the camera system of FIG. 7A, according to an example embodiment.

FIG. 7A is a diagram illustrating an operation of a camera system, according to an example embodiment. FIG. 7B is a schematic signal timing diagram of the camera system of FIG. 7A, according to an example embodiment.

In one example embodiment, the camera system of FIG. 7A has substantially the same structure and operation as the camera system of FIG. 6A and will be thus described focusing on the differences from the camera system of FIG. 6A to avoid a redundant description.

In one example embodiment, the synchronization signal line 150A is connected to the ground voltage GND source and initialized to the ground voltage GND in the camera system of FIG. 6A, whereas a synchronization signal line 150B is connected to a supply voltage VDD source via a pull-up resistor (PUR) and initialized to a supply voltage VDD in the camera system of FIG. 7A.

Referring to FIGS. 7A and 7B, the synchronization signal line 150B is electrically connected to the supply voltage VDD source via the pull-up resistor (PUR) and may thus have a logic high level at an initial stage (e.g., before a point of time t1).

In one example embodiment, if a third control circuit 120-3 first enables a third transmission synchronization signal TS3 to a logic low level at the first point of time t1 in a state in which the synchronization signal line 150B has the supply voltage VDD (i.e., the logic high level), the synchronization signal line 150B goes logic low according to the third transmission synchronization signal TS3. Thus, first to third received synchronization signals RS1, RS2, and RS3 output from first to third receivers 123-1 to 123-3 also go logic low.

In one example embodiment, a first control circuit 120-1 enables a first transmission synchronization signal TS1 to a logic low level at a second point of time t2, and a second control circuit 120-2 enables a second transmission synchronization signal TS2 to a logic low level at a third point of time t3. If it is assumed that enable periods (e.g., logic low periods) of the first to third transmission synchronization signal TS1 to TS3 are the same, the third transmission synchronization signal TS3, the first transmission synchronization signal TS1, and the second transmission synchronization signal TS2 are respectively disabled to a logic high level at fourth, fifth and sixth points of time t4, t5, and t6.

The first to third received synchronization signals RS1 to RS3 go logic high at the sixth point of time t6 according to the second transmission synchronization signal TS2 disabled to the logic high level at a latest point of time.

In one example embodiment, a first timing controller 127-1 may detect a timing difference TRO3 between a rising edge of the first transmission synchronization signal TS1 and a rising edge of the first received synchronization signal RS1, and output a first timing control signal TCON1 for delaying a point of time when the first transmission synchronization signal TS1 is to be enabled by the detected timing difference TRO3. Thus, the first synchronization signal generator 125-1 may output the first transmission synchronization signal TS1 having the same timing as the second transmission synchronization signal TS2 by delaying a subsequent point of time when the first transmission synchronization signal TS1 is to be enabled by the detected timing difference TRO3.

In one example embodiment, a timing difference between a rising edge of the second transmission synchronization signal TS2 and a rising edge of the second received synchronization signal RS2, which is detected by a second timing controller 127-2, may be '0' or a value approximating '0'. Thus, the timing of the second transmission synchronization signal TS2 is not controlled.

The third timing controller 127-3 may detect a timing difference TRO4 between a rising edge of the third transmission synchronization signal TS3 and a rising edge of the third received synchronization signal RS3, and output a third timing control signal TCON3 for delaying a point of time when the third transmission synchronization signal TS3 is to be enabled by the timing difference TRO4. Thus, the third synchronization signal generator 125-3 may output the third transmission synchronization signal TS3 having the same timing as the second transmission synchronization signal TS2 by delaying a subsequent point of time when the third transmission synchronization signal TS3 is to be enabled by the timing difference TRO4.

Figure 8:
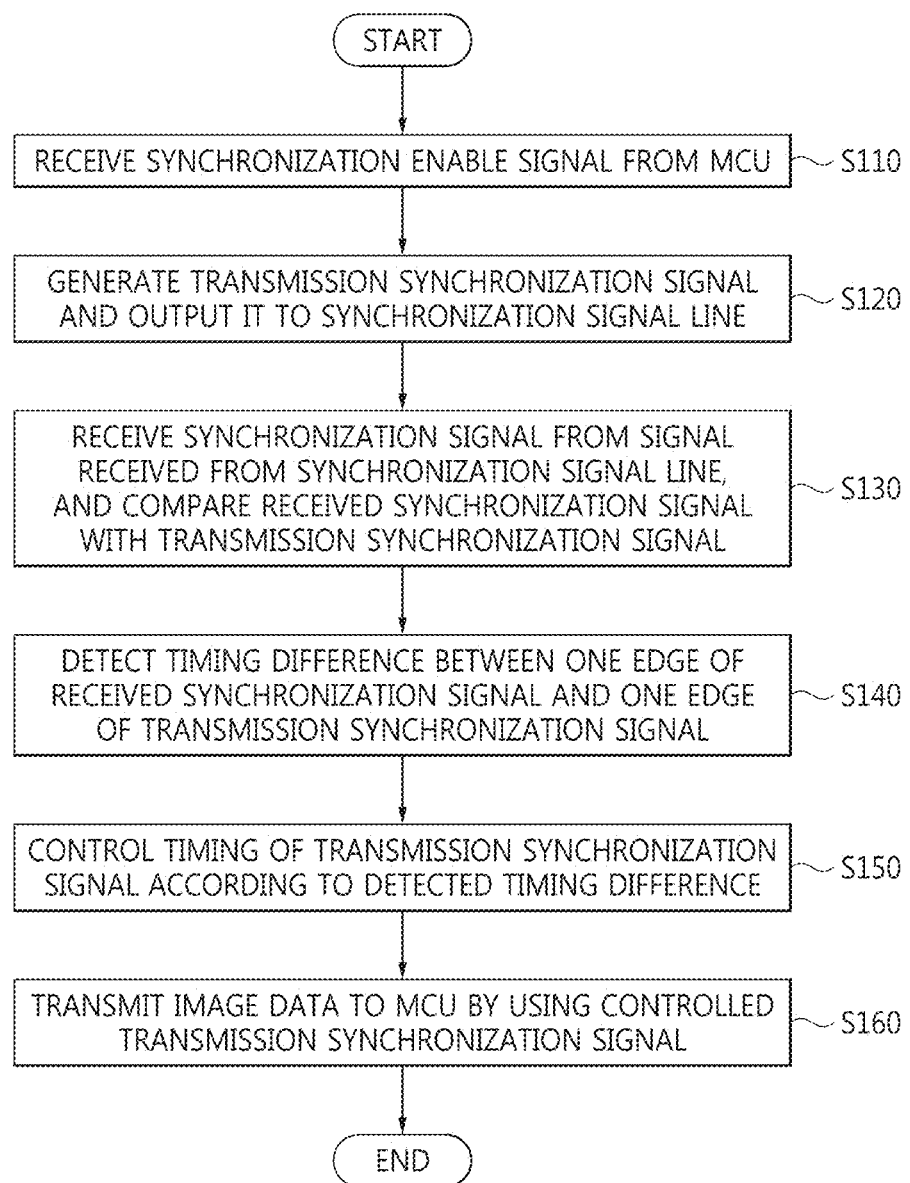
FIG. 8 is a flowchart of a method of operating a camera, according to an example embodiment.

FIG. 8 is a flowchart of a method of operating a camera, according to an example embodiment. The method of FIG. 8 may be performed by one of the plurality of cameras 100-1 to 100-n of the camera system 10A of FIG. 1 or the camera system 10B of FIG. 2. For description purposes, FIG. 8 will be described with reference to camera 100-1.

Referring to FIGS. 1, 2, and 8, at operation S110, the camera 100-1 receives a synchronization enable signal from a micro-controller unit (MCU). In one example embodiment, the MCU corresponds to the camera control module 200 of FIG. 1 or 2.

In one example embodiment, the MCU may supply the synchronization enable signal to a corresponding camera when operations of at least two cameras need to be synchronized with each other.

Alternatively, when the MCU drives at least two cameras, a synchronization enable signal may be enabled in each of the at least cameras. At operation S120, the camera 100-1 may generate a transmission synchronization signal thereof and output it to a synchronization signal line in response to the synchronization enable signal received from the MCU.

In one example embodiment, the camera 100-1 may generate a transmission synchronization signal thereof and output it to the synchronization signal line regardless of the synchronization enable signal received from the MCU. For example, when the camera 100-1 is driven to start an operation thereof, the transmission synchronization signal may be generated.

Furthermore, at operation S130, the camera 100-1 may receive a transmission synchronization signal, generated by another camera (e.g., camera 100-2) from the synchronization signal line, and compare the received transmission synchronization signal with the transmission synchronization signal. Thereafter and at operation S140, the camera 100-1 detects a timing difference between one edge (e.g., a falling edge or a rising edge) of the received transmission synchronization signal and one edge (e.g., a falling edge or a rising edge) of the transmission synchronization signal.

At operation S150, the camera 100-1 controls a timing of the transmission synchronization signal according to the detected timing difference.

At operation S160, the camera 100-1 transmits image data to the MCU based on the controlled transmission synchronization signal. The image data may be a still image signal or a moving picture signal captured by an image sensor of the camera 100-1. The camera may transmit the image data in units of frames to the MCU according to the transmission synchronization signal.

In one example embodiment, the operations of the method may be performed in an order different from that described above, and at least two operations among the operations may be performed in parallel.

Figure 9:
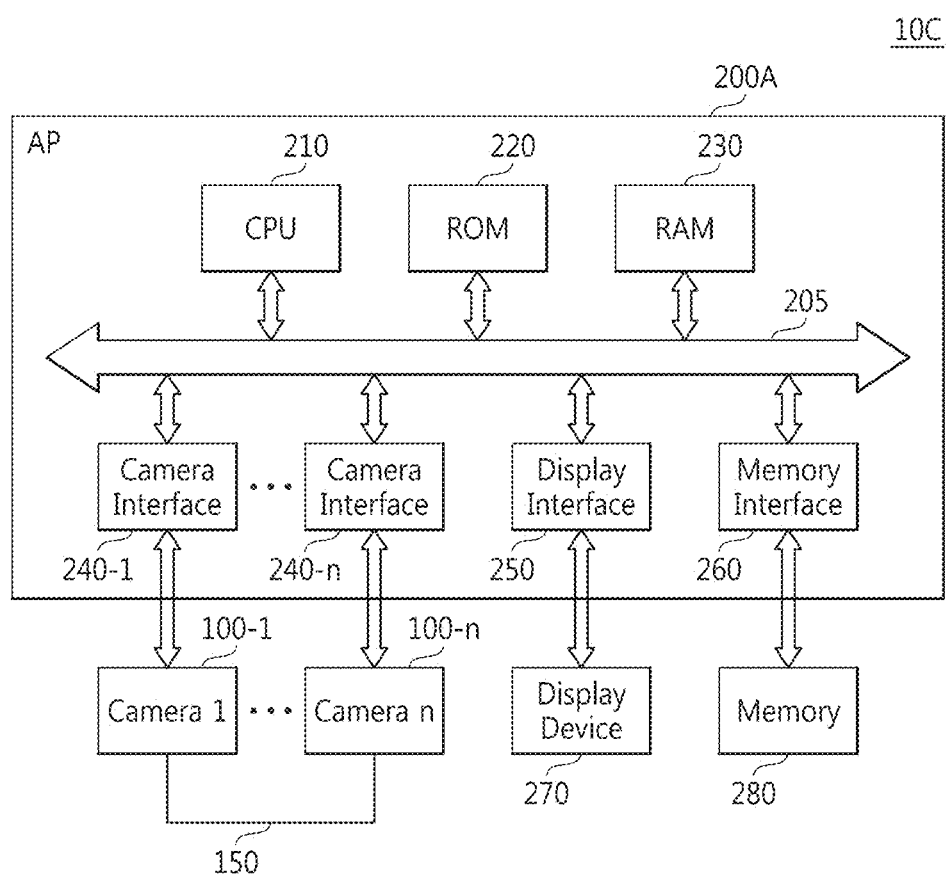
FIG. 9 is a block diagram of a camera system, according to an example embodiment.
Figure 10:
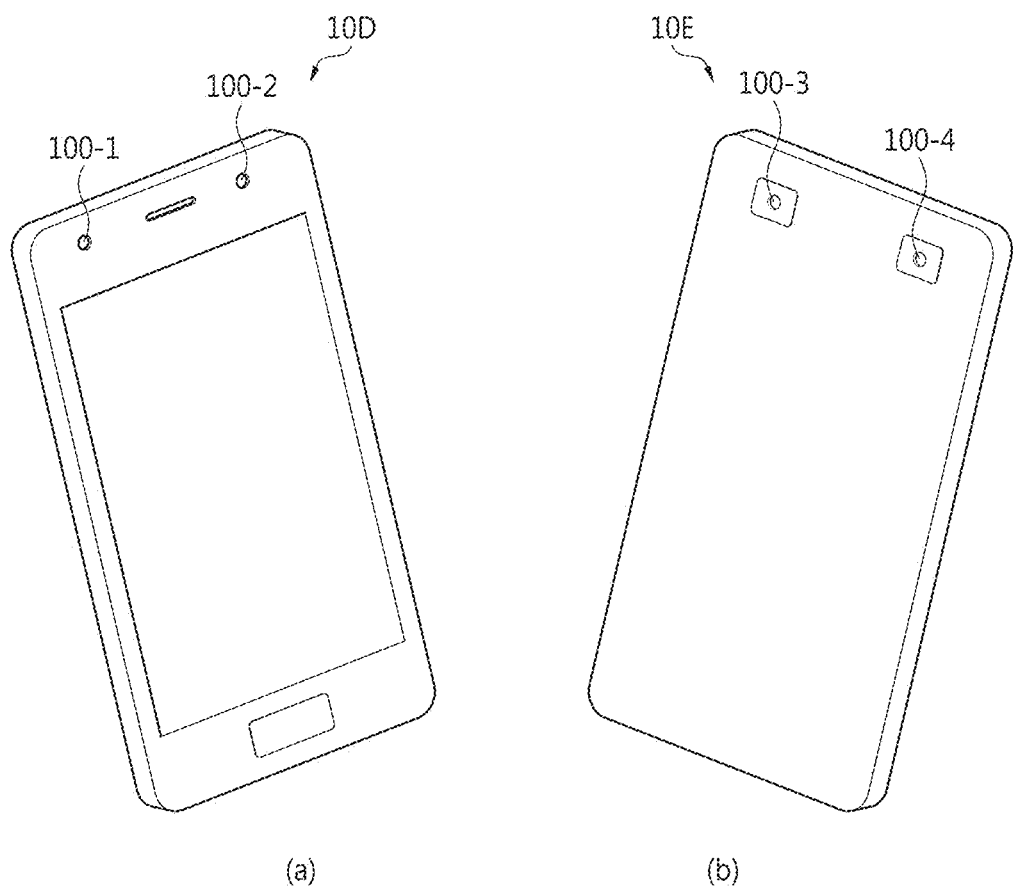
FIG. 10 is a diagram illustrating the exterior of the camera system of FIG. 9, according to an example embodiment.

FIG. 9 is a block diagram of a camera system, according to an example embodiment. FIG. 10 is a diagram illustrating an example of the exterior of the camera system of FIG. 9.

Referring to FIGS. 9 and 10, the camera system 10C may be embodied as any one of, but not limited to, a mobile terminal (e.g., a smart phone), a tablet personal computer (PC), a personal digital assistant (PDA), an enterprise digital assistant (EDA), a mobile Internet device (MID), an e-book, or the like.

The camera system 10C may include an application processor (AP) 200A, a plurality of cameras 100-1 to 100-$n$, a display device 270, and a memory 280.

As illustrated in FIG. 10, the plurality of cameras 100-1 to 100-$n$ may include first and second cameras 100-1 and 100-2 located on a front surface part 10D of the camera system 10C, and third and fourth cameras 100-3 and 100-4 located on a rear surface part 10E of the camera system 10C.

The first and second cameras 100-1 and 100-2 on the front surface part 10D may be used to recognize a user's face or obtain a stereo image of a background or an object located in front of the camera system 10C.

The third and fourth cameras 100-3 and 100-4 on the rear surface part 10E may be used to obtain a stereo image of a background or an object located in the rear of the camera system 10C or to obtain a high dynamic range image by differently setting conditions (e.g., exposure times, focuses, etc.) of the third and fourth cameras 100-3 and 100-4.

Thus, the camera system 10C may select and operate at least two cameras among the plurality of cameras 100-1 to 100-$n$ according to an application program driven in the camera system 10C or a menu selected by the user. Also, the camera system 10C may request operations of at least two cameras selected among the plurality of cameras 100-1 to 100-$n$ to be synchronized with each other. In this case, each of the selected at least two cameras may control a timing of a transmission synchronization signal thereof based on a timing difference between the transmission synchronization signal and a received synchronization signal thereof as described above, thereby synchronizing timings of the transmission synchronization signals of the selected two or more cameras with each other.

Each of the plurality of cameras 100-1 to 100-$n$ may transmit image data to the AP 200A according to a timing-controlled transmission synchronization signal thereof, so that the AP 200A may receive and process synchronized image data.

The AP 200A may include a central processing unit (CPU) 210, a read-only memory (ROM) 220, a random access memory (RAM) 230, a plurality of cameras interfaces 240-1 to 240-$n$, a display interface 250, and a memory interface 260.

The AP 200A may be embodied as a system-on-chip (SoC). The AP 200A corresponds to the camera control module 200 of FIG. 1 or 2. The elements 210, 220, 230, 240-1 to 240-$n$, 250, and 260 of the AP 200A may exchange data with one another via a bus 205.

The CPU 210 may control overall operations of the AP 200A. For example, the CPU 210 may process or execute programs and/or data stored in the ROM 220 and/or the RAM 230.

In one example embodiment, the CPU 210 may be embodied as one computing component including at least two independent processors (or cores), i.e., as a multi-core processor.

The ROM 220 may store programs (e.g., computer-readable instructions) and/or data which are continuously used. In one example embodiment, the ROM 220 may be embodied as an erasable programmable ROM (EPROM), an electrically erasable programmable ROM (EEPROM), or the like.

The RAM 230 may temporarily store programs, data, and/or instructions. In one example embodiment, the RAM 230 may be embodied as a dynamic RAM (DRAM) or a static RAM (SRAM).

The RAM 230 may temporarily store data input or output via the interfaces 240-1 to 240-$n$, 250, and 260 or data generated by the CPU 210.

The plurality of camera interfaces 240-1 to 240-$n$ may respectively control the plurality of cameras 100-1 to 100-$n$.

The display interface 250 may interface data (e.g., image data) output to the display device 270 outside the AP 200A.

The display device 270 may output an image or data regarding the image via a display such as a liquid-crystal display (LCD), an active matrix organic light emitting diode (AMOLED), etc.

The memory interface 260 may interface data input from or data output to the memory 280 outside the AP 200A.

In one example embodiment, the memory 280 may be embodied as a non-volatile memory, e.g., a flash memory, a resistive memory, etc.

FIG. 11 is a flowchart of a method of operating a camera, according to an example embodiment. The method of FIG. 11 may be performed by the camera system 10C of FIG. 9 but is not limited thereto.

Referring to FIGS. 9 and 11, at operation S210, the CPU 210 runs an application using a plurality of cameras, e.g., at least two cameras, in the camera system 10C.

Then at operation S220, the AP 200A (via the CPU 210) drives a plurality of cameras.

At operation S230, the AP 200A (via the CPU 210) may supply a synchronization enable signal to a corresponding camera to synchronize operations of the plurality of cameras with one another. In one example embodiment, the operation S230 may be skipped. For example, when the plurality of cameras are driven, a series of operations, e.g., operations S240 to S260, which will be described below, may be performed to synchronize the plurality of cameras with one another without supplying a synchronization enable signal.

In one example embodiment, each of the plurality of cameras generates a transmission synchronization signal and outputs the same to a synchronization signal line commonly connected to the plurality of cameras. Furthermore, each of the plurality of cameras receives one or more transmission synchronization signal(s) transmitted by each of the plurality of cameras via the synchronization signal line. At operation S240, each of the plurality of cameras compares the received synchronization signal(s) with its own corresponding transmission synchronization signal.

For example, each of the plurality of cameras detects a timing difference between one edge (e.g., a falling edge or a rising edge) of the received synchronization signal(s) and one edge (e.g., a falling edge or a rising edge) of its own corresponding transmission synchronization signal.

At operation S250, each of the plurality of cameras controls a timing of the transmission synchronization signal according to result of comparing the received synchronization signal(s) with its own corresponding transmission synchronization signal.

At operation S260, each of the plurality of cameras transmits image data to the AP 200A, based on the timing-controlled transmission synchronization signal. The image data may be a still image signal or a moving picture signal captured by an image sensor of the camera. In one example embodiment, each of the plurality of cameras may transmit the image data in units of frames to the AP 200A according to the transmission synchronization signal.

At operation S270, the AP 200A (via the CPU 210) receives at least two pieces of already synchronized image data from the plurality of cameras, and processes the at least two pieces of already synchronized image data. Thus, a process of receiving pieces of non-synchronized image data from the plurality of cameras and internally synchronizing the pieces of non-synchronized image data with each other, performed by the AP 200A, may be eliminated.

In one example embodiment, the operations of the method of FIG. 11 may be performed in an order different from that described above and at least two operations among the operations may be performed in parallel.

FIG. 12 is a diagram illustrating a case in which a camera system is applied to a vehicle, according to one example embodiment. Referring to FIG. 12, the vehicle includes a camera system.

The camera system for use in the vehicle may include a plurality of cameras ① to ⑥, and a main body (not shown) configured to control the plurality of cameras. The plurality of cameras ① to ⑥ may include, but are not limited to, a headway sensing camera ① for sensing a lane and/or an obstacle in front of the vehicle, an interior sensing camera ② for sensing the inside of the vehicle, a night-vision camera ③ for sensing an obstacle, etc. at night, a side-view sensing camera ④ for sensing a side view of the vehicle, a side-back view sensing camera ⑤ for sensing a blind spot of the vehicle, a rear-view sensing camera ⑥ for sensing a rear view of the vehicle, etc.

The camera system for use in the vehicle may be embodied as a parking assistance system, a car safety assistant system, an advanced driver assistant system (ADAS), or a vehicle operation record system, e.g., a vehicle black box, etc.

The camera system according to an example embodiment of the inventive concepts is applicable to not only the vehicle but also any type of a system using a plurality of cameras (e.g., a safety system, a closed-circuit television (CCTV) system, a drone (unmanned aerial vehicle) camera system, etc.).

According to an example embodiment of the inventive concepts, operations of remaining cameras are automatically synchronized with one camera as a reference camera. Thus, a plurality of cameras may be synchronized with one another without any intervention of a camera control module or with a minimum intervention of the camera control module.

According to an example embodiment of the inventive concepts, a plurality of cameras are connected to one synchronization signal line. Thus, even if the number of the plurality of cameras is large, a connection between the plurality of cameras is not complex. The plurality of cameras may be synchronized with a camera starting to operate at an earliest point of time or at a latest point of time among the plurality of cameras. Accordingly, one of the plurality of cameras need not be set beforehand as a reference camera.

While the inventive concepts have been particularly shown and described with reference to the example embodiments illustrated in the drawings, the example embodiments are non-limiting. It would be obvious to those of ordinary skill in the art that these example embodiments are to cover all modifications, equivalents, and alternatives falling within the scope of the inventive concepts. Accordingly, the technical scope of the inventive concepts should be defined based on the technical idea of the appended claims.

What is claimed is:

1. A camera comprising:
an image sensor; and
a control circuit configured to control the image sensor,
wherein the camera is configured to
transmit an image data to a multi-core processor via a first line,
receive a synchronization enable signal from the multi-core processor via a second line different form the first line,
transmit a first synchronization signal to another camera via a third line different from the first and second lines, and
receive a second synchronization signal from the another camera via the third line, and
wherein the control circuit includes a timing controller configured to receive the second synchronization signal and control a timing of transmitting the image data to the multi-core processor based on the second synchronization signal.

2. The camera of claim 1, wherein
the timing controller is further configured to detect a timing difference between the first synchronization signal and the second synchronization signal, and adjust a timing of the first synchronization signal,
the camera is further configured to transmit the image data according to the adjusted timing of the first synchronization signal, and
the third line is connected to a ground voltage source.

3. The camera of claim 2, wherein the third line is connected to the ground voltage source via a pull-down resistor.

4. The camera of claim 1, wherein
the timing controller is further configured to detect a timing difference between the first synchronization signal and the second synchronization signal, and adjust a timing of the first synchronization signal,
the camera is further configured to transmit the image data according to the adjusted timing of the first synchronization signal, and
the third line is connected to a supply voltage.

5. The camera of claim 4, wherein the third line is connected to the supply voltage via a pull-up resistor.

6. The camera of claim 1, further comprising:
an actuator,
wherein the camera is further configured to control the image sensor and the actuator according to a control signal received from the multi-core processor via the second line.

7. The camera of claim 6, wherein the camera is further configured to adjust a position of lens by controlling the actuator according to the control signal.

8. A camera comprising:
an image sensor; and
a control circuit configured to control the image sensor,
wherein the camera is configured to,
transmit an image data to a multi-core processor via a first line,
receive a synchronization enable signal from the multi-core processor via a second line,
transmit a first synchronization signal to a first another camera via a third line,
receive a second synchronization signal from the first another camera via the third line when the first another camera is in an operational state, and
receive a third synchronization signal from a second another camera via the third line when the second another camera is in an operational state, and
wherein the control circuit includes a timing controller configured to receive the second synchronization signal and control a timing of transmitting the image data to the multi-core processor based on the second synchronization signal.

9. The camera of claim 8, wherein
the timing controller is further configured to detect a timing difference between the first synchronization signal and the second synchronization signal, and adjust a timing of the first synchronization signal,
the camera is further configured to transmit the image data according to the adjusted timing of the first synchronization signal, and
the third line is connected to a ground voltage source.

10. The camera of claim 9, wherein the third line is connected to the ground voltage source via a pull-down resistor.

11. The camera of claim 8, wherein
the timing controller is further configured to detect a timing difference between the first synchronization signal and the second synchronization signal, and adjust a timing of the first synchronization signal,
the camera is further configured to transmit the image data according to the adjusted timing of the first synchronization signal, and
the third line is connected to a supply voltage.

12. The camera of claim 11, wherein the third line is connected to the supply voltage via a pull-up resistor.

* * * * *